United States Patent [19]
Enk

[11] Patent Number: 5,495,925
[45] Date of Patent: Mar. 5, 1996

[54] ANTI-THEFT DEVICE FOR A MOTOR VEHICLE

[75] Inventor: Karl-Georg Enk, Schweinfurt, Germany

[73] Assignee: Fichtel & Sachs AG, Schweinfurt, Germany

[21] Appl. No.: 212,962

[22] Filed: Mar. 15, 1994

[30] Foreign Application Priority Data

Mar. 16, 1993 [DE] Germany ............... 43 08 326.9

[51] Int. Cl.$^6$ ............... B60R 25/00; B60K 23/02
[52] U.S. Cl. ............... 192/3.63; 70/237; 180/287; 192/83; 477/174
[58] Field of Search ............... 70/245, 248, 237; 180/287; 477/86, 97, 174; 192/3.63, 83

[56] References Cited

U.S. PATENT DOCUMENTS

| 1,058,166 | 4/1913 | Evans | 180/287 |
|---|---|---|---|
| 3,718,202 | 2/1973 | Brock | 70/245 X |
| 4,232,758 | 11/1980 | Crosas | 180/287 |
| 4,509,625 | 4/1985 | Tellert . | |
| 5,006,843 | 4/1991 | Hauer | 180/287 X |
| 5,101,926 | 4/1992 | Berman et al. | 180/287 X |
| 5,179,868 | 1/1993 | Thibeault | 70/248 X |

FOREIGN PATENT DOCUMENTS

| 3827660 | 3/1989 | Germany | 70/245 |
|---|---|---|---|
| 2144171 | 2/1985 | United Kingdom | 70/237 |

*Primary Examiner*—Rodney H. Bonck
*Attorney, Agent, or Firm*—Nils H. Ljungman & Associates

[57] ABSTRACT

An anti-theft device for a motor vehicle has a control device for disengaging at least a part of the drive train of the motor vehicle when an incorrect security code is entered, and can allow for normal operation upon entry of a correct security code.

15 Claims, 3 Drawing Sheets

ANTI-THEFT DEVICE FOR A MOTOR VEHICLE

BACKGROUND OF THE INVENTION

1. Field of the Invention

This invention generally relates to an anti-theft device for a motor vehicle driven by an internal combustion engine, and having a drive train which includes the internal combustion engine, a gear transmission, and a drive shaft for driving wheels of the motor vehicle. More particularly, the present invention relates to an anti-theft device which can de-activate an operable part of the drive train and thereby make the motor vehicle immobile under its own power.

2. Background Information

Due to the ever-present threat of having a motor vehicle stolen, many types and varieties of anti-theft devices have been developed. A first type of such devices includes alarm systems which can monitor the motor vehicle for unauthorized entry into the motor vehicle. Such alarm devices generally include sound or breakage sensors for detecting the breakage of a window, and possibly switches which monitor the position of the closed doors. These devices also typically include a siren which is activated upon the detection of a break-in in the hope of discouraging thieves from continuing their theft activities. While such alarm systems may have a discouraging siren, thieves may, in cities where false-alarm occurrences are common, possibly continue their activities, and could still steal the motor vehicle.

In addition to alarm systems, anti-theft devices also include physical devices, such as steering column collars which block access to the ignition switch, and devices which fit on the steering wheel to prevent rotation thereof and thus the inability to steer the motor vehicle, etc. Such physical devices are generally keyed devices, and can often be overcome by picking the locks thereof, or even physically removing the devices by cutting or breaking, etc. In essence, such physical devices are sometimes meant as merely a visible deterrent to prospective thieves, who, upon seeing such an installed device, may tend to go to another vehicle which does not have any visible protection devices.

Alternative anti-theft devices may possibly disengage, or deactivate, a motor vehicle system, thereby making it essentially impossible to move a motor vehicle under its own power.

OBJECT OF THE INVENTION

The object of the present invention is to provide an anti-theft device for a motor vehicle which primarily utilizes existing components of the motor vehicle to disengage at least a portion of the drive train of the motor vehicle and thereby make the motor vehicle immobile under its own power unless an appropriate activation code is entered during the start-up procedures for the motor vehicle.

SUMMARY OF THE INVENTION

In motor vehicles which have drive trains that are equipped with automatic clutch activation devices, such activation devices are essentially designed for the automatic engagement and disengagement of the clutch, and can essentially be controlled according to the driver's requirements, whereby sensors can be used to determine various operating conditions of the vehicle, the drive train, and/or of the engine.

The present invention teaches that the object set forth above can be achieved by means of a motor vehicle, driven by an internal combustion engine and having an automatic clutch activation device, wherein there can preferably be: a control device to activate the activation device; sensors which are connected to the control device to monitor certain operating conditions of the motor vehicle; and a device for detecting an authorized or unauthorized use of the vehicle. This detecting device can preferably be connected to the control device of the clutch activation device in a manner such that, when an incorrect code is entered, the clutch can preferably be placed in a disengaged position.

The presence of a device which detects authorized or unauthorized use of the vehicle and is connected to the control device can act on the control device for the clutch, if unauthorized use is attempted. In such a case, the control device, via the activation device, can preferably disengage the clutch to prevent transfer of power from the engine to the transmission. Thus, when the clutch is disengaged, it is essentially impossible to start and run the vehicle under its own power.

In accordance with an additional characteristic of the present invention, it can preferably be advantageous that the control device comprise a coding device wherein the user would essentially need to input a multi-digit numerical code for activation and deactivation thereof. By means of such a coding device, any legal owner or user of the vehicle would be able to input a specified code before starting the engine. The control device could thus recognize that the legal owner was starting the vehicle, and could activate the clutch in the necessary manner for operation, that is, for movement of the motor vehicle. As an alternative, it may also be conceivable that the vehicle could first be started before the activation code is entered, in which case the vehicle will still not be movable. The operator could then enter a code, etc. in order to make the clutch usable. Under such instances, it might be preferable that a short period of time be provided for entering the code, and if no code is entered, a further activation could be provided which could shut off the vehicle.

In summary, one aspect of the invention resides broadly in an anti-theft system for a motor vehicle. The motor vehicle has a drive train, and the drive train comprises: an engine for generating mechanical power to move the motor vehicle; wheels for being driven by the mechanical power generated by the engine; a shaft device for receiving the mechanical power of the engine and transmitting the mechanical power to the drive wheels to move the motor vehicle; a transmission connecting the engine to the shaft device; and apparatus for engaging and disengaging at least part of the drive train to respectively engage and disengage the engine from the wheels. The anti-theft system comprises a device for detecting at least one of: an authorized user of the motor vehicle to produce a signal for permitting engagement of the at least a part of the drive train, and an unauthorized user of the motor vehicle to produce a signal for disengaging the at least a part of the drive train; and apparatus for receiving the produced signal and correspondingly operating the apparatus for engaging and disengaging to: permit engagement of the drive train for an authorized user, and disengage the drive train for an unauthorized user.

Another aspect of the invention resides broadly in an anti-theft device for a motor vehicle, the motor vehicle having: an engine for generating mechanical power, wheels for receiving the mechanical power to move the motor vehicle, a clutch device for engaging and disengaging the engine and the wheels, apparatus for automatically engaging and disengaging the clutch device to automatically engage and disengage the engine and the wheels, and a control device for operating the apparatus for automatically engaging and disengaging to automatically engage and disengage the clutch device. The anti-theft device comprises: apparatus for detecting at least one of: an authorized user of the vehicle to produce a signal for permitting engagement of the clutch to permit engagement of the engine with the wheels, and an unauthorized user of the vehicle to produce a singal for disengaging the clutch to disengage the engine from the wheels; and the control device comprising apparatus for receiving the produced signals to correspondingly operate the apparatus for automatically engaging and disengaging to: permit engagement of the clutch for an authorized user, and disengage the clutch for an unauthorized user.

A further aspect of the invention resides braodly in a method for protecting a motor vehicle from being stolen, the motor vehicle having a drive train and an anti-theft system, the drive train having an engine for generating mechanical power to move the motor vehicle, wheels for being driven by the mechanical power generated by the engine, a shaft device for receiving the mechanical power of the engine and transmitting the mechanical power to the drive wheels to move the motor vehicle, and apparatus for engaging and disengaging at least part of the drive train to respectively engage and disengage the engine from the wheels, the anti-theft system comprises: apparatus for detecting at least one of: an authorized user of the motor vehicle to produce a signal for permitting engagement of the at least a part of the drive train, and an unauthorized user of the motor vehicle to produce a signal for disengaging the at least a part of the drive train; and means for receiving the produced signal and correspondingly operating the apparatus for engaging and disengaging to: permit engagement of the drive train for an authorized user, and disengage the drive train for an unauthorized user. The method comprising the steps of detecting at least one of: an authorized user of the motor vehicle, and an unauthorized user of the motor vehicle, producing a signal corresponding to the at least one of: the authorized user of the motor vehicle, and an unauthorized user of the motor vehicle; and receiving the produced signal to one of: permit engagement of at least a part of the drive train upon detecting an authorized user, and disengage at least a part of the drive train upon detecting an unauthorized user.

BRIEF DESCRIPTION OF THE DRAWINGS

The principle of the invention is explained in greater detail by means of the embodiments illustrated in the accompanying drawings, in which.

DESCRIPTION OF THE PREFERRED EMBODIMENT

Figure 1:
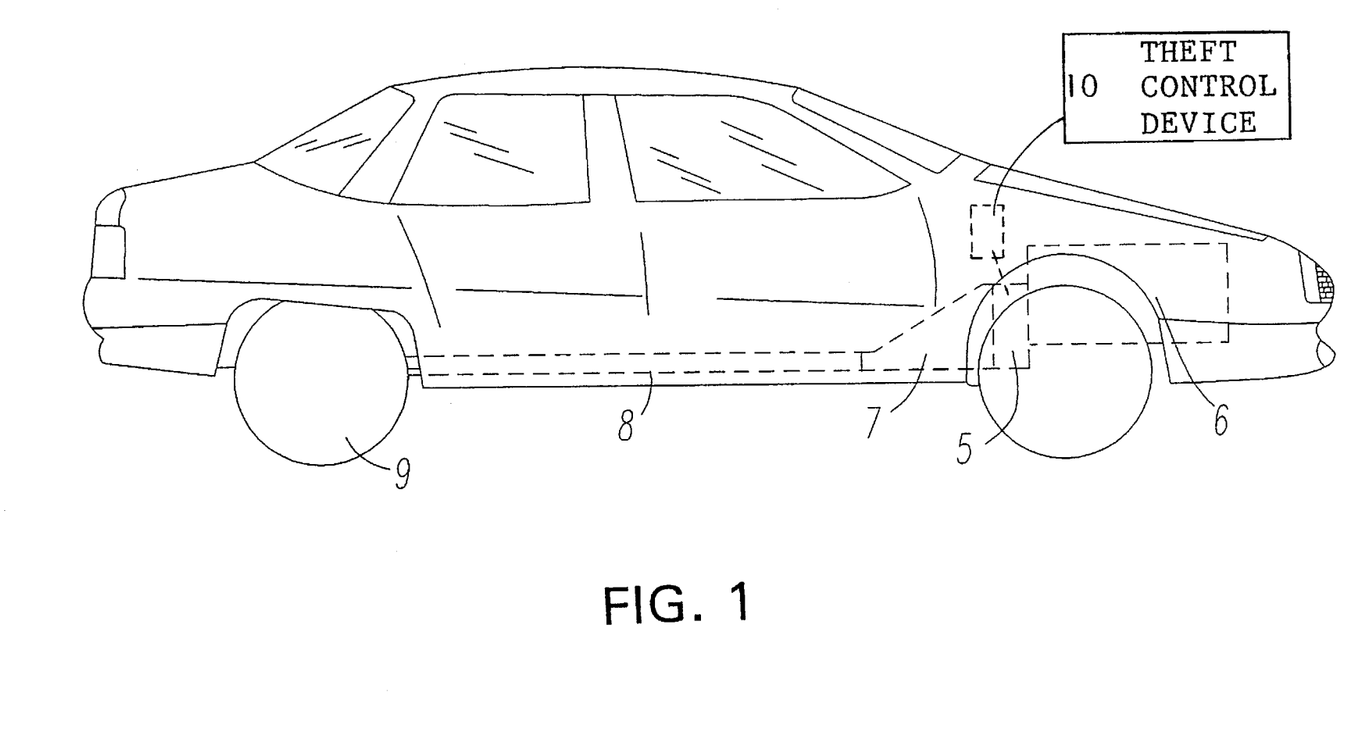
FIG. 1 shows a typical motor vehicle having an anti-theft device according to the present invention.

FIG. 1 shows what could be considered to be a typical automobile having rear wheel drive. Such an automobile will typically have an internal combustion engine 6 mounted in a forward portion thereof. The automobile will also typically have a transmission 7 and a drive shaft 8 for transmitting mechanical power generated by the engine 6 to the rear wheels 9. Further, if the transmission 7 is a manual transmission, the drive train will also generally have a clutch 5 for engaging the engine with the transmission. As discussed previously, it is also known to provide an automatic clutch activation system for engaging and disengaging the clutch. Such a clutch activation system can be at least a part of a theft control device 10, which can be used to prevent theft of a motor vehicle under the vehicles own power. One embodiment for a clutch activation system which can be used in accordance with an anti-theft device is shown in FIG. 2.

Figure 2:
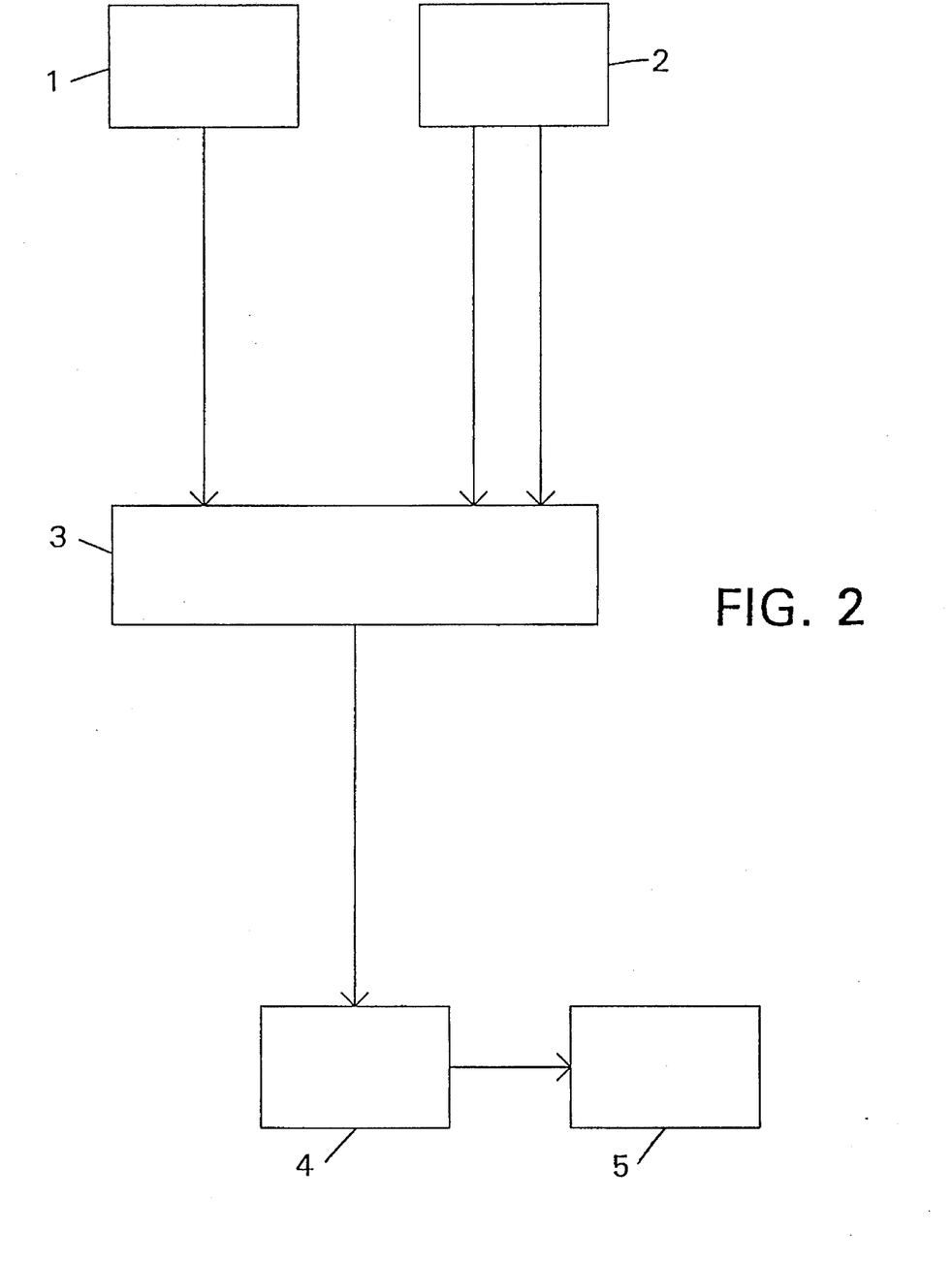
FIG. 2 shows a schematic illustration of a control system for providing anti-theft protection for the motor vehicle.

In the depicted anti-theft arrangement as shown in FIG. 2, a control device 3, in particular an electronic control device, can be connected to the clutch 5 by means of an activation device 4. The activation device 4 can preferably be configured to engage and disengage the clutch in accordance with the signal received from at least the control device 3. Such an activation device can operate purely mechanically, or it can also be hydraulically assisted, for example, to move the clutch between the engaged and disengaged positions.

The control device 3 can be at least a part of the theft control device 10, and can preferably be connected to sensors 2 which monitor engine or vehicle data, for example. The activation device 4 of the clutch can preferably be operated as appropriate on the basis of these data. For anti-theft protection, the control device 3 can also be connected to a coding device 1, by means of which an additional input into the control device 3 can be made. If the vehicle user has the correct input code, he can input the correct code into the control device 3 by means of the coding device 1, and the control device can then activate the clutch in the desired manner. But if the coding device 1 is given the incorrect code, the control device 3 can preferably activate the activation device 4 of the clutch 5, so that the clutch 5 remains in the open position and thus in a disengaged state. This disengaged condition can then remain in effect until the correct code is input via the coding device 1, that is, once the correct code is entered, the clutch can be re-engaged and can then operate as normal.

If an incorrect code is input, or if no code is input, the vehicle will essentially not be able to move under its own power, since the force transmission connection between the engine and transmission is interrupted by the disengaged clutch. Thus, a vehicle equipped in accordance with the present invention will essentially not be able to be stolen under the vehicle's own power.

The coding device 1 can, for example, be a multi-key numeric key pad for inputting a multi-digit numeric code. The control device can thus preferably be programmable to recognize at least one particular numeric sequence, which numeric sequence can preferably be given to an authorized user of the vehicle. Thus, if an incorrect numerical sequence, or no numerical sequence, is entered, the control device can cause the activation device to move the clutch into a disengaged position to prevent the vehicle from being moved under its own power. The clutch can then preferably be maintained in this disengaged state until a correct code is entered.

Figure 3:
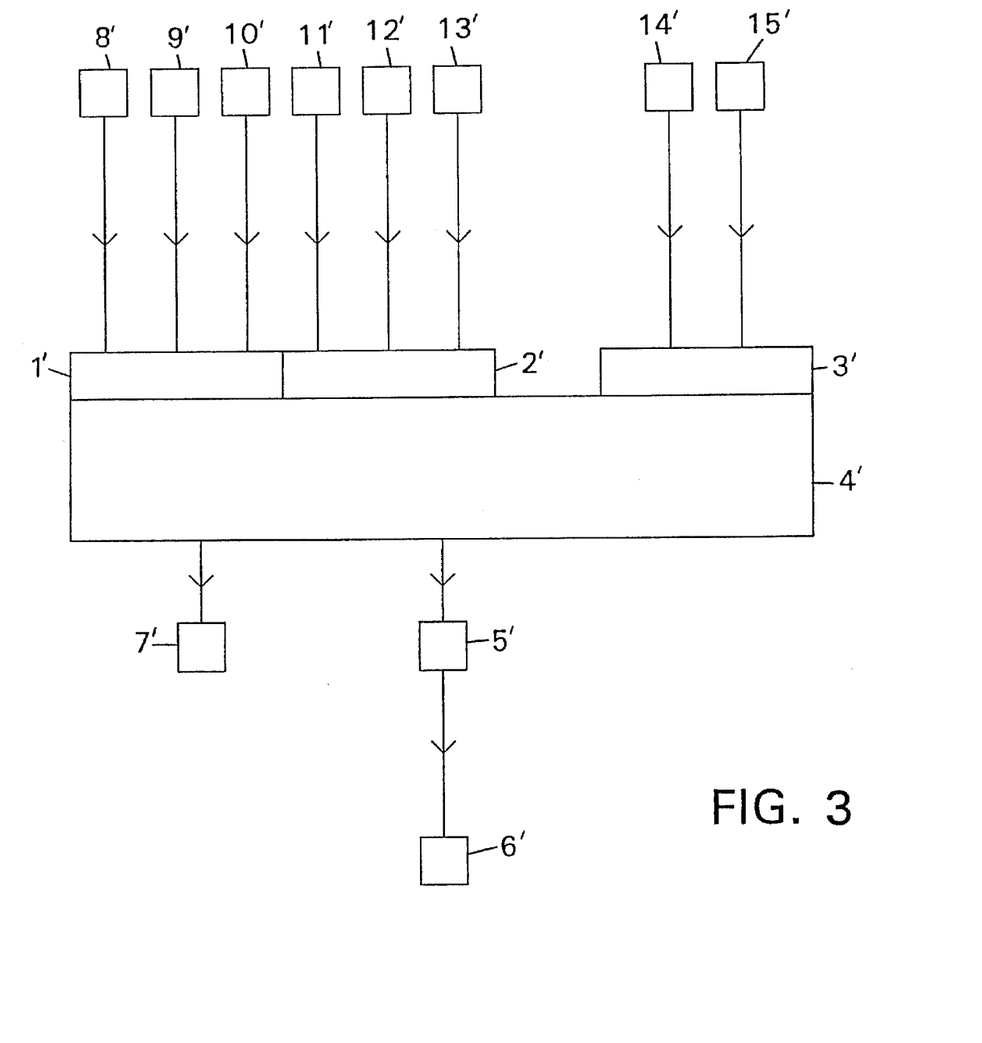
FIG. 3 shows a more detailed schematic of additional components of the control system.

FIG. 3 depicts an alternative embodiment of a system which can be used in accordance with the present invention. In the embodiment of FIG. 3, the control device 4' is shown as a part of the automated clutch activation device. It is connected to an activation device 5' which, for its part, is connected in turn to the start/shift clutch 6'. The activation device 5' can thereby have mechanical or hydraulic components which can shift the clutch 6' into either limit position, that is, the engaged position or the disengaged position. The control device 4' can preferably have an input 3' which can preferably be connected to operating condition sensors 15'. Such operating condition sensors 15' can be speed sensors, for example. The input 3' in this case can also be equipped with a starting sensor 14'. This starting sensor 14' can provide a signal to the control device 4' when an attempt has been made to start the vehicle, and upon detection of such an attempt to start the vehicle, if a correct actuation code has not been received, can move the clutch to a disengaged state and thereby prevent movement of the vehicle.

The control device 4' can also be equipped with an input 1' which can be designed to receive locking signals, and with an input 2' which can be designed to receive unlocking signals. Each of these inputs 1' and 2' can preferably be connected to a series of sensors 8', 9', 10' and 11', 12', 13' respectively. The control device 4' can also be connected to the ignition device 7' of the internal combustion engine, to control the engine.

The sensors connected to the input 1' can preferably be at least one of: a door lock sensor 8', a key sensor 9' and/or an ignition lock sensor 10'. The sensors connected to input 2' can preferably be at least one of: a door lock sensor 11', a key sensor 12' and/or an input sensor 13'. While various combinations of the above sensors are possible, several particularly advantageous combinations of these input sensors 8' to 13' are described below.

When door lock sensors 8' and 11' are used for the locking and unlocking signal, the system can be very easy to operate, and can offer a high degree of protection against unauthorized operation and vandalism. If there is already a central locking system in the vehicle, the automated clutch activation device with anti-theft protection can be installed very economically, and can comprise a part of the central locking system. In such a configuration, an unlocking signal from the locking system can be used to unlock, or free the clutch for use, while a locking signal from a door lock, can put the control device in a configuration to disengage the clutch upon an attempt to start the vehicle if an unlocking signal is not first received.

When a key sensor 9' or 12' is used for the two inputs 1' and 2' respectively, a coded signal can be used, which coded signal can be automatically read when an ignition key is removed or inserted into the ignition lock. Thus, if one does not have a key to fit the ignition, the clutch will be disengaged upon an attempt to start the vehicle, wherein, on the other hand, if a key is inserted in to the ignition, the control can be deactivated for free operation of the clutch. Such a device is particularly easy for the driver to use, and is thus accepted very easily, and it also offers a high degree of protection against unauthorized operation and vandalism.

It may also be advantageous, however, to use an ignition lock sensor 10' for the input 1' and a key sensor 12' for the input 2'. The key sensor 12' can thereby be checked both in the ignition lock and in a separate location. Such a combination offers particular security against unauthorized operation.

Instead of the combinations described above, it can also be possible to equip the input 2' with a separate input sensor 13, by means of which the unlocking signal can be input manually, for example, such as by means of a multi-digit code as described previously. This system has the same advantages as indicated above.

It is of course also possible to connect a theft alarm to the control device 4'. This theft alarm can, in the conventional manner, send a signal to the vehicle horn, but it can also activate other noise-making devices, or the vehicles headlights and taillights. This theft alarm can also be connected directly to the control device as one of the inputs, and upon a break-in being detected can cause the control device to move the clutch into the disengaged position to prevent movement of the vehicle.

Some examples of anti-theft systems for motor vehicles which deter movement of the motor vehicle can be found in the following U.S. Pat. No. 5,090,223 to Ruffler, entitled "Car Theft Deterrent to Deflate Tires"; No. 4,818,029 to Mourot and Dana entitled "Vehicle Anti-Theft Device Making at Least One Wheel Unserviceable, and a Wheel Comprising the Device"; and No. 4,678,068 to Matthews et al. entitled "Automobile Brake Locking System".

Some additional anti-theft devices that are operated by means of inputting a code by a key pad are disclosed in the following U.S. Pat. No. 5,023,591 to Edwards, entitled "Anti-Theft Control Apparatus"; No. 4,742,327 to Burgess and Kaufman entitled "Keyless Access Control and Security System"; and No. 4,463,340 to Adkins and Frantz, entitled "Anti-Theft Control System".

One type of clutch activation device is disclosed, for example, in German Patent No. 3 028 250 which corresponds to U.S. Pat. No. 4,509,625. In this known device, there is a control device which is connected to sensors to activate the activation device to move an actuator of the clutch between an engaged position and a disengaged position. The sensors monitor certain operating conditions of the motor vehicle or of the drive train, and on the basis of the signals from the sensors, the control device can automatically activate the friction clutch in response to the driver's wishes, to either start the vehicle or change gears.

Other examples of clutch actuation devices are disclosed in U.S. Pat. Nos. 4,971,183 and 4,854,433, both of which were issued to Rudy Tellert, and 4,434,879 to Lutz et al.

Some additional examples of friction clutches, clutch activation devices, and related accessories carl be found in the following U.S. Pat. No. 4,343,387 issued in Aug. 1982 to Hofbauer; No. 4,331,226 issued in May 1982 to Heidermeyer et al.; No. 4,295,551 issued in Oct. 1981 to Zimmermann et al.; No. 4,208,929 issued in Jun. 1980 to Heino et al.; No. 4,081,065 issued in March of 1978 to Smyth et al.; No. 4,023,660 issued in May of 1977 to Dickinson; and No. 4,019,614 issued in April of 1977 to Prenzel et al.

A first feature of the invention resides broadly in an automatic clutch activation device in a motor vehicle driven by an internal combustion engine, comprising a starter/clutch with an activation device, a control device to activate the activation device, and sensors which are connected to the control device to monitor certain operating conditions, characterized by the fact that there is a device 1 to detect an authorized or unauthorized use of the vehicle, which is connected to the control device 3 such that when an incorrect code is entered, the clutch 5 is placed in the disengaged position.

A further feature of the invention resides broadly in the clutch activation device, characterized by the fact that the device comprises a coding device 1 with a multi-digit numerical code.

One feature of an additional embodiment of the invention resides broadly in an automated clutch activation device in a motor vehicle powered by an internal combustion engine, comprising a start/shift clutch with an activation device, a control device to activate the activation device, and sensors which are connected to the control device to monitor certain operating conditions, characterized by the fact that the control device 4' has an input 1' to receive a locking signal and an input 2' to receive an unlocking signal, so that after a locking signal has been recorded, an attempt to start the vehicle is determined to be inadmissible unless an unlocking signal has also been received, and the activation device 5' is activated by the control device 4' such that the clutch 6' is moved into the open (disengaged) position.

Still another feature of the invention resides broadly in the clutch activation, characterized by the fact that the control device 4' also interrupts the ignition device 7' of the internal combustion engine.

Still another feature of the invention resides broadly in the clutch activation, characterized by the fact that the inputs 1', 2' for locking and unlocking signals are each connected to respective door lock sensors 8', 11'.

Yet another feature of the invention resides broadly in the clutch activation, whereby a central locking system is integrated into the vehicle, characterized by the fact that the inputs 1', 2' for the locking and unlocking signals are each connected to the electronic control system of the central locking system.

Another feature of the invention resides broadly in the clutch activation, characterized by the fact that the inputs 1', 21' for the locking and unlocking signals are connected to a separate key sensor 9', 12'.

Still another feature of the invention resides broadly in the clutch activation, characterized by the fact that the input 1' for the locking signal is connected to an ignition lock sensor 14'.

Yet still another feature of the invention resides broadly in the clutch activation, characterized by the fact that the input 2' for the unlocking signal is connected to a separate input sensor 13'.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 08 326, filed on Mar. 16, 1993, having inventor Karl-Georg Enk, and DE-OS P 43 08 326 and DE-PS P 43 08 326, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A combination clutch activation and anti-theft system for a motor vehicle, the motor vehicle having a drive train, and the drive train having an engine for generating mechanical power to move the motor vehicle, a key-operated ignition for starting the engine and operating the motor vehicle, wheels for being driven by the mechanical power generated by the engine, shaft means for receiving the mechanical power of the engine and transmitting the mechanical power to the drive wheels to move the motor vehicle, and a transmission connecting the engine to the shaft means, said clutch activation and anti-theft system comprising:

a clutch for engaging and disengaging the engine and the transmission;

an automatic clutch activation device for engaging and disengaging the clutch to respectively engage and disengage the engine from the wheels, the automatic clutch activation device having a first limit position for engaging the clutch and a second limit position for disengaging the clutch, and being movable between said first and second limit positions;

said automatic clutch activation device comprising:
sensor means for monitoring an operating condition of at least one of: the engine, the wheels, and the transmission;
control means for operating said automatic clutch activation device, said control means comprising means for monitoring said sensor means, and said control means comprising means for operating the automatic clutch activation device to automatically engage and disengage the clutch in response to predetermined operating conditions of the at least one of: the engine the wheels, and the transmission;

a keypad for inputting a multi-digit code and producing an electronic signal corresponding to said input code; and said control means comprises means for receiving said produced signal and correspondingly operating said automatic clutch activation device to:

permit engagement of the clutch for an authorized user upon receipt of at least a first pre-determined multi-digit code within a predetermined period of time before or after starting of the engine with the key-operated ignition system, and disengage the clutch for an unauthorized user upon one of:
receiving a multi-digit code different from said at least a first multi-digit code, and
not receiving a multi-digit code, within the predetermined period of time before or after starting of the engine with the key-operated ignition system.

2. The anti-theft device according to claim 1, wherein said keypad comprises a numeric key pad for inputting a multi-digit numeric code.

3. The anti-theft device according to claim 2, wherein:

said means for automatically engaging and disengaging the clutch means comprises one of:

hydraulically assisted means for automatically engaging and disengaging the clutch means, and mechanically assisted means for automatically engaging and disengaging the clutch means.

4. The anti-theft device according to claim 3, wherein the clutch means comprises a friction clutch, and the engine comprises an internal combustion engine.

5. In a motor vehicle, a drive system including an anti-theft device, the drive system comprising:

an engine for generating mechanical power, a key-operated ignition system for starting the engine and providing a reference time point for said anti-theft device, wheel means for receiving the mechanical power to move the motor vehicle, clutch means for engaging the engine with the wheel means, the clutch means having an engaged position for engaging the engine with the wheel means, and a disengaged position for disengaging the engine and the wheel means, means for automatically moving the clutch means between the engaged and disengaged positions to automatically engage and disengage the engine and the wheel means, and means for monitoring at least one operating condition of the motor vehicle and producing a signal corresponding to said at least one operating condition, control means for operating said means for automatically moving, said control means comprising means for receiving said produced operating condition signal and means for operating said means for automatically moving to automatically engage and disengage said clutch means in response to said produced operating condition signal, and said anti-theft device, said anti-theft device comprising:
means for producing a signal for permitting engagement of the clutch means to permit engagement of the engine with the wheel means; and said control means comprising means for receiving said produced engagement signal of said anti-theft device to correspondingly operate said means for automatically engaging and disengaging to:

permit engagement of the clutch for an authorized user upon receipt of said produced engagement signal within a predetermined period of time before or after starting of the engine, and disengage the clutch for an unauthorized user upon not receiving said produced engagement signal within a predetermined period of time immediately before or after starting of the engine.

6. The anti-theft device according to claim 5, further including:

said means for producing said engagement signal comprising means for inputting a multi-digit numerical code; and said control means being configured for:

permitting engagement of the clutch upon receipt of at least a first pre-determined multi-digit numerical code within the predetermined period of time; and disengaging the clutch upon one of:
receiving a multi-digit numerical code different from said at least a first pre-determined multi-digit numerical code, and not receiving a multi-digit numerical code, within the predetermined period of time.

7. The anti-theft device according to claim 6, wherein:

the drive system additionally comprises means for transferring the mechanical power from the engine to the wheel means;

the clutch means comprises means for engaging and disengaging the power transferring means and the engine;

the means for monitoring an operating condition of the motor vehicle additionally comprises sensor means for monitoring an operating condition of at least one of:

the engine,
the wheel means, and
the power transferring means, and said means for receiving said produced operating condition signal comprises means for monitoring said sensor means to automatically engage and disengage the clutch means in response to predetermined operating conditions of said at least one of:

the engine,
the wheel means, and
the power transferring means.

8. The anti-theft device according to claim 7, wherein said means for inputting said multi-digit numeric code comprises a numeric key pad for inputting said multi-digit numeric code.

9. The anti-theft device according to claim 8, wherein:
said power transferring means comprises:
a transmission, and
shaft means connecting the transmission to the wheel means; and the clutch means comprises means for engaging and disengaging the engine and the transmission.

10. The anti-theft device according to claim 9, wherein:
the clutch means comprises a friction clutch;
the engine comprises an internal combustion engine;
said means for moving the clutch means comprises one of:

hydraulically assisted means for automatically engaging and disengaging the clutch means, and mechanically assisted means for automatically engaging and disengaging the clutch means.

11. A method for protecting a motor vehicle from being stolen, the motor vehicle having a drive train, the drive train having an engine for generating mechanical power to move the motor vehicle, a key-operated ignition system for starting the engine and operating the motor vehicle, wheels for being driven by the mechanical power generated by the engine, shaft means for receiving the mechanical power of the engine and transmitting the mechanical power to the drive wheels to move the motor vehicle, clutch means for engaging and disengaging the engine and the wheels to respectively engage and disengage the engine from the wheels, an automatic clutch activation device for automatically engaging and disengaging the clutch means to respectively engage and disengage the engine and the wheels, the automatic clutch activation device having a first limit position for engaging the clutch and a second limit position for disengaging the clutch, and being movable between the first and second limit positions, said automatic clutch activation device comprising: sensor means for monitoring an operating condition of at least one of: the engine, the wheels, and the transmission, and control means for operating said automatic clutch activation device, said control means comprising means for monitoring said sensor means, and means for operating the automatic clutch activation device to automatically engage and disengage the clutch means in response to predetermined operating conditions of the at least one of: the engine, the wheels, and the transmission, an anti-theft system comprising: a keypad for inputting a multi-digit code and producing an electronic signal corresponding to said input code; and said control means comprises means for receiving said produced signal and correspondingly operating said automatic clutch activating device to: permit engagement of the clutch for an authorized user upon receiving at least a first pre-determined multi-digit code within a predetermined period of time before or after starting of the engine, and disengage the clutch for an unauthorized user upon one of: receiving a multi-digit numeric code different from the predetermined multi-digit code, and not receiving any multi-digit code within the predetermined period of time before or after starting of the engine, said method comprising the steps of:

providing the drive train for a motor vehicle;

providing said automatic clutch activation device for engaging and disengaging said clutch means;

providing said keypad for inputting a multi-digit code and producing a signal corresponding to said input code;

providing said means for receiving said produced signal; and one of:

upon receiving said at least a first pre-determined multi-digit code within said predetermined period of time before or after starting the engine, permitting engagement of said clutch means; and upon receiving one of: a multi-digit code different from said pre-determined code, and no multi-digit code within the predetermined period of time before or after starting the engine, disengaging said clutch means.

12. The method according to claim 11, wherein the drive train additionally comprises a transmission between the engine and the wheels, and said method further comprises the steps of:

receiving said produced signal with said control means to one of:

permit engagement of said clutch means during starting of the motor vehicle to permit engagement of the engine and the transmission, and disengage said clutch means during starting of the motor vehicle to disengage the engine from the transmission 13. The method according to claim 12, wherein said method further comprises automatically operating said clutch means during operation of the motor vehicle in response to said predetermined operating conditions of said at least one of: the engine, the wheels, and the transmission.

14. The method according to claim 13, wherein said keypad comprises a numeric key pad for inputting a multi-digit numeric code, and said method further comprises inputting the multi-digit numeric code with the numeric key pad.

15. The method according to claim 14, wherein said clutch means comprises a friction clutch, the engine comprises an internal combustion engine, and said means for automatically engaging and disengaging the clutch means comprises one of: hydraulically assisted means for automatically engaging and disengaging said clutch means, and mechanically assisted means for automatically engaging and disengaging said clutch means.

* * * * *

UNITED STATES PATENT AND TRADEMARK OFFICE
CERTIFICATE OF CORRECTION

PATENT NO. : 5,495,925
DATED : March 5, 1996
INVENTOR(S) : Karl-Georg ENK

It is certified that error appears in the above-indentified patent and that said Letters Patent is hereby corrected as shown below:

In column 6, line 36, after 'accessories', delete "carl" and insert --can--.

Signed and Sealed this

Twenty-fourth Day of December, 1996

Attest:

BRUCE LEHMAN

Attesting Officer        Commissioner of Patents and Trademarks